United States Patent

Lines

[15] 3,648,662
[45] Mar. 14, 1972

[54] VENTILATING SYSTEM FOR LIVESTOCK FEEDERS
[72] Inventor: Jerry J. Lines, Minneapolis, Minn.
[73] Assignee: K & K Manufacturing Inc., Rogers, Minn.
[22] Filed: Oct. 16, 1969
[21] Appl. No.: 867,000

[52] U.S. Cl. ............................................................. 119/71
[51] Int. Cl. ........................................................ A01k 09/00
[58] Field of Search ............... 119/71, 51.11, 51.5; 222/190, 222/146 H; 34/201, 218

[56] References Cited

UNITED STATES PATENTS 2,245,664   6/1941   Gronert .............................. 34/174 X
3,208,431   9/1965   Kloss ................................... 119/51.11
3,258,850   7/1966   Swanson .............................. 34/218 X Primary Examiner—Hugh R. Chamblee
Attorney—Merchant & Gould

[57] ABSTRACT

A forced air ventilating system for animal feeders wherein dry granular food is mixed with a liquid to provide predetermined quantities of liquid food. A blower is arranged to move dry air through a mixing chamber in a direction away from a dry food reservoir and dispensing mechanism for the dry food, to prevent absorption of moisture by the dry food prior to the dispensing thereof to the mixing chamber.

12 Claims, 10 Drawing Figures

Patented March 14, 1972

INVENTOR.
JERRY J. LINES
BY
Merchant & Gould
ATTORNEYS

Patented March 14, 1972
3,648,662
3 Sheets-Sheet 2
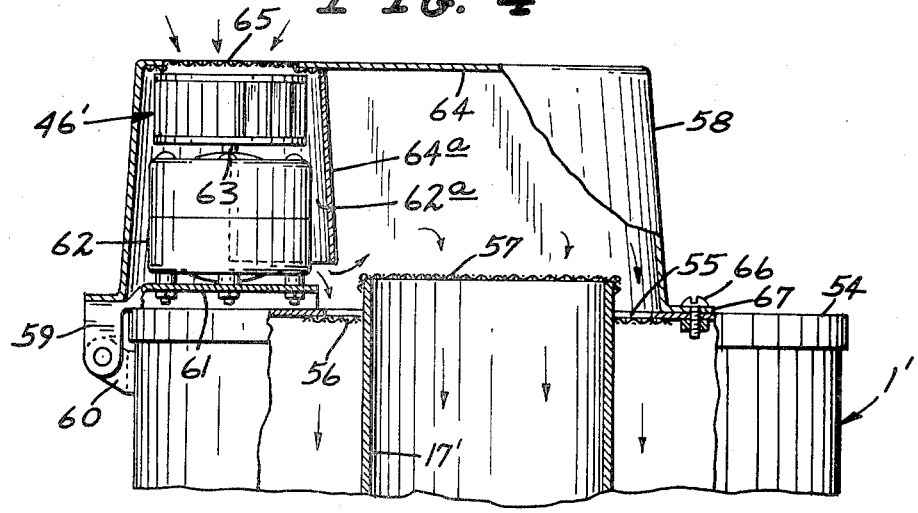
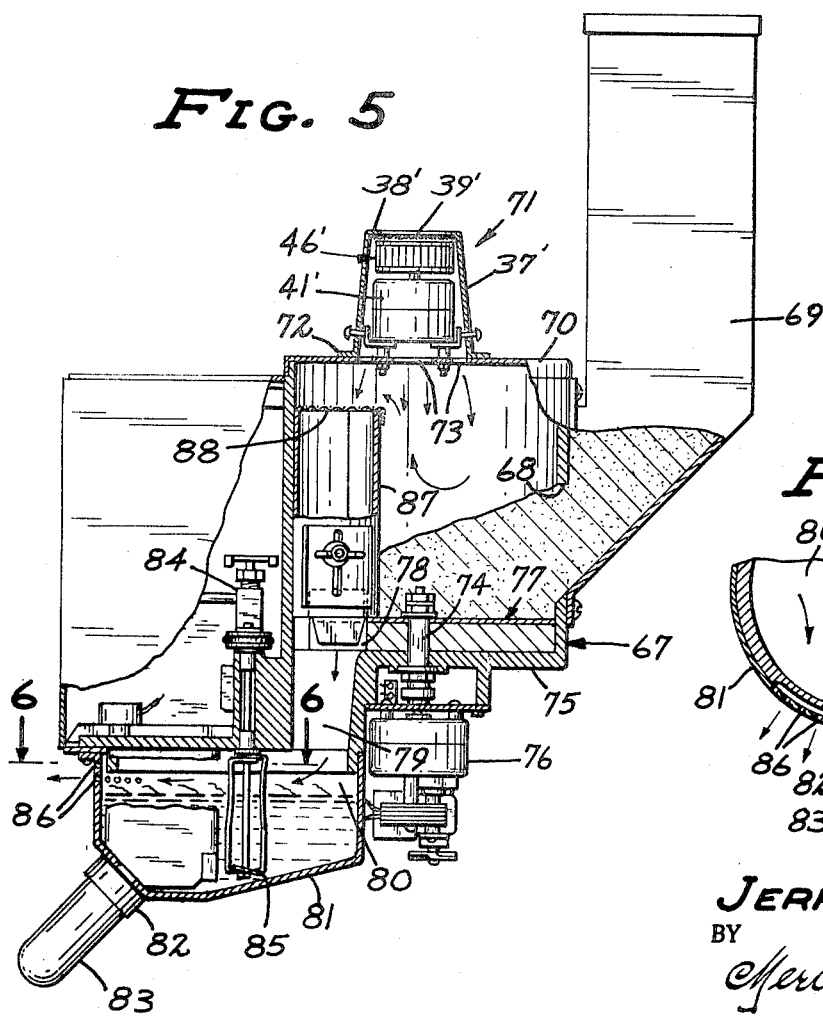
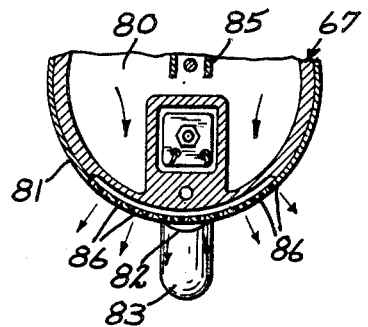
INVENTOR.
JERRY J. LINES
BY
Merchant & Gould
ATTORNEYS Patented March 14, 1972
3,648,662
3 Sheets-Sheet 3
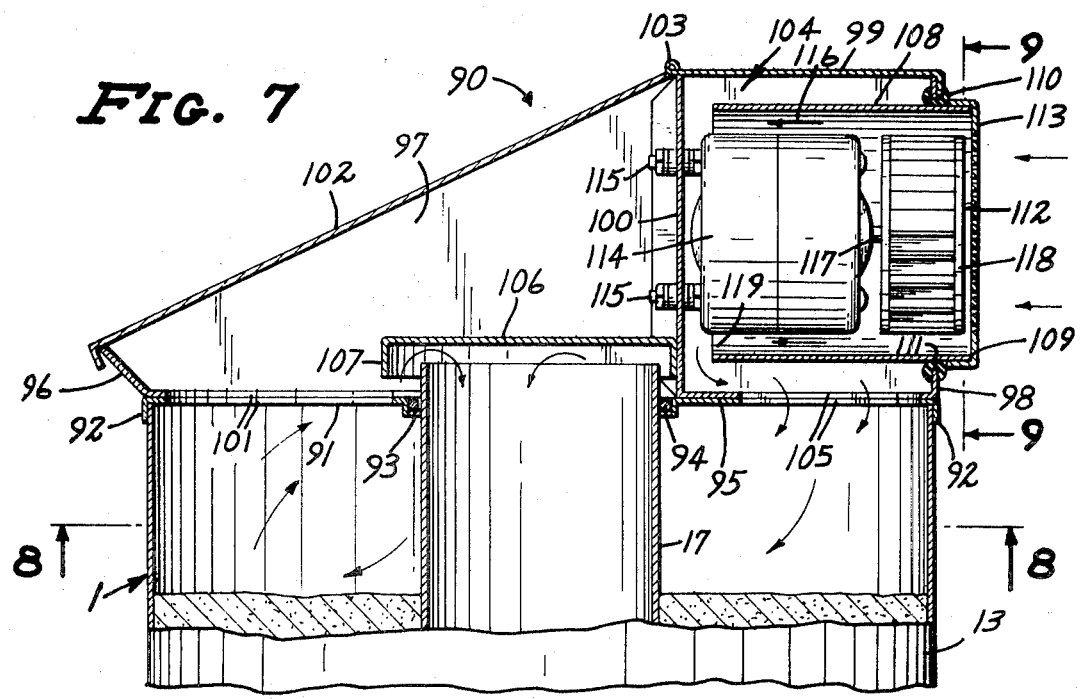
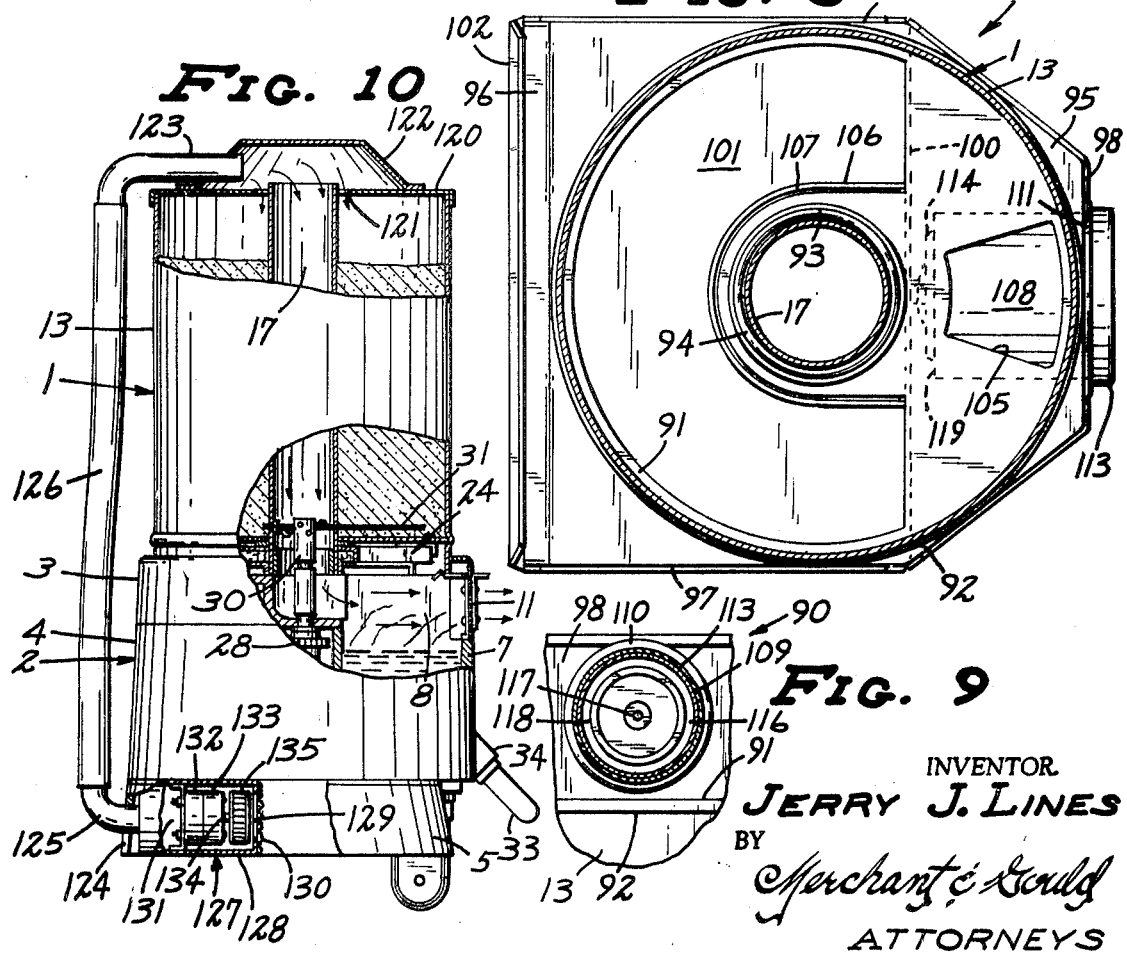
INVENTOR.
JERRY J. LINES
BY
Merchant & Gould
ATTORNEYS

3,648,662

VENTILATING SYSTEM FOR LIVESTOCK FEEDERS

BACKGROUND OF THE INVENTION

Liquid food mixers and animal feeders, wherein dry granular food is mixed with water or other liquids to provide a liquid food, are well known, and are disclosed in U.S. Letters Pat. Nos. 3,037,481, 3,208,431 and 3,265,036, all assigned to the assignee of the present invention. In mixers and feeders of these types, in which dry food drops by gravity from the dispensing mechanism to the mixing chamber, moisture from the mixing chamber often condenses in the dry food dispensing mechanism and even on the inner wall surfaces of the dry food reservoir, and is absorbed by the dry food therein. When this occurs, the dry food becomes caked or sufficiently moist to prevent proper and uniform dispensing thereof to the mixing chamber. Due to the fact that animal feeders are often located out of doors or in unheated buildings, the moisture problem becomes aggravated in cold or damp weather.

SUMMARY OF THE INVENTION

The present invention utilizes the ventilating apertures and vent tubes or flues normally found in the feeders of the above-mentioned patents, but further includes a power driven fan or blower to provide a flow of air through the feeders in a reverse direction from that of the normal upward draft provided by the apertures and vent tubes or flues. The blower is arranged to direct air from the exterior of the feeder downwardly through the vent tube and through the reservoir and dry food dispensing mechanism to the mixing chamber above the normal liquid level therein. From thence, the air moves outwardly through the mixing chamber ventilating aperture to the exterior of the feeder, carrying with it whatever moisture is picked up thereby in the mixing chamber. The drive motor for the fan is disposed in the path of air flow and releases heat to the air stream for improved moisture absorption. In colder or damp weather, a heating element may be used to aid the drive motor in heating the air for more efficient moisture absorption.

DESCRIPTION OF THE DRAWINGS

FIG. 4 is a view corresponding to a portion of FIG. 1, but showing a modified arrangement;

FIG. 5 is a view in side elevation of a different form of animal feeder with the ventilating system of this invention incorporated therewith, some parts being broken away and some parts being shown in section;

FIG. 6 is an enlarged fragmentary section taken substantially on the line 6—6 of FIG. 5;

FIG. 7 is an enlarged fragmentary view corresponding to a portion of FIG. 1, but showing a further modification;

FIG. 8 is a transverse section taken substantially on the line 8—8 of FIG. 7 on a reduced scale;

FIG. 9 is a fragmentary section taken on the line 9—9 of FIG. 7, on a reduced scale; and FIG. 10 is a view in side elevation of the feeder of FIG. 1, some parts being broken away and some parts being shown in section, showing the opposite side of the feeder on a reduced scale and including another modified form of the invention.

DETAILED DESCRIPTION

Figure 1:
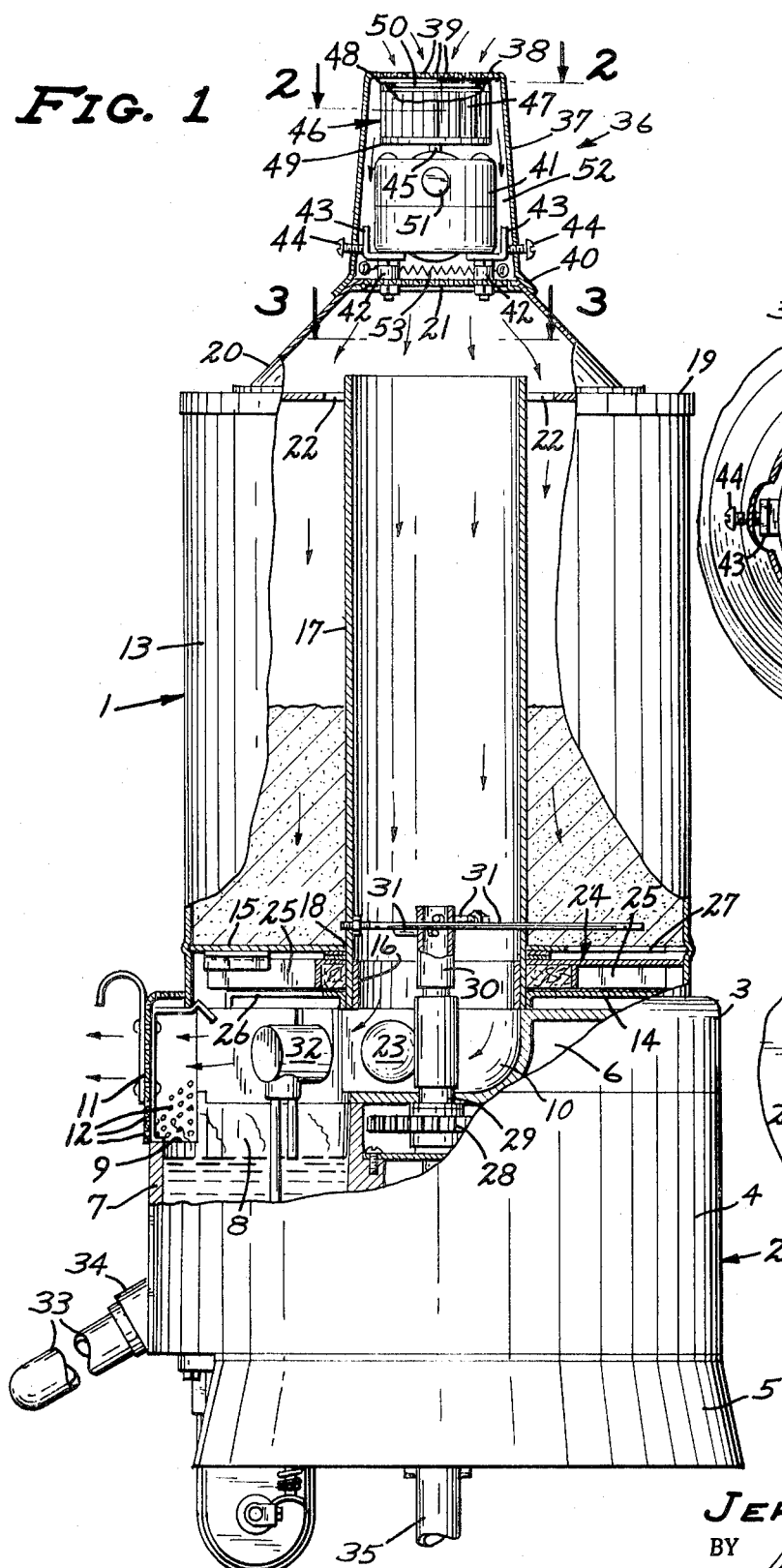
FIG. 1 is a view in side elevation of a liquid food mixer and animal feeder with the ventilating system of this invention incorporated therewith, some parts being broken away and some parts being shown in section.
Figure 2:
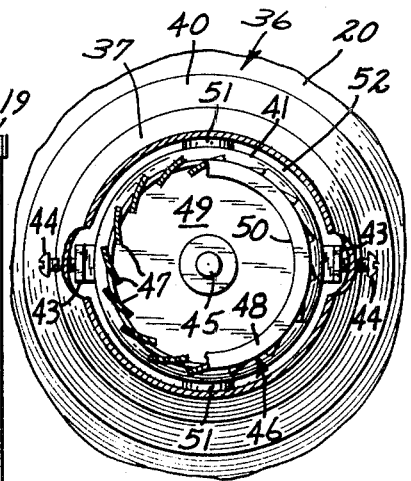
FIG. 2 is an enlarged fragmentary section taken substantially on line 2—2 of FIG. 1.
Figure 3:
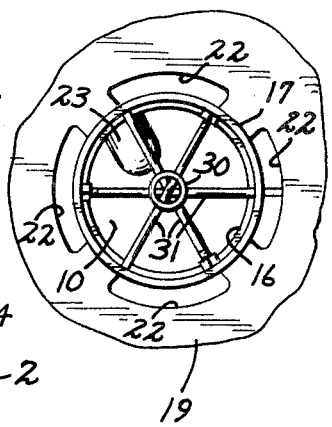
FIG. 3 is a fragmentary section taken substantially on the line 3—3 of FIG. 1.

Referring particularly to FIGS. 1-3, a generally cylindrical dry food storage container or reservoir 1 is mounted on the upper end of a generally cylindrical base, indicated generally at 2, and axially aligned therewith. The base 2 comprises axially aligned upper, intermediate and lower base sections 3, 4 and 5 respectively, secured together by suitable means, not shown. The base sections 3 and 4 cooperate to define a chamber 6 for a drive motor, not shown. The base section 4 defines a bowl 7 for reception of liquid, such as water, the bowl 7 and overlying portion of the base section 3 cooperating to define a mixing chamber 8. The base sections 3 and 4 further cooperate to define an opening 9 at the front portion of the base 2 and above the bowl 7, the upper base section 3 defining a passage 10 extending radially inwardly from the mixing chamber 8 to the central portion of the base section 3. The opening 9 is normally covered by a cover plate or the like 11 perforated to provide air passage means in the nature of openings 12 extending from the mixing chamber 8 to the exterior of the mixer and feeder.

The dry food storage container or reservoir 1 comprises a cylindrical wall 13, an annular bottom wall 14, and a horizontally disposed annular partition 15 in overlying spaced parallel relation to the bottom wall 14, the bottom wall 14 and the partition 15 being rigidly secured to the cylindrical wall 13 by suitable means, not shown. The bottom wall 14 is provided at its central portion with an axially extending tubular bearing 16 which journals an axially extending vent tube or flue 17 that extends upwardly through a central opening 18 in the partition 15, the vent tube 17 terminating at its upper end slightly above the level of the upper end of the cylindrical wall 13. An annular lid or cover 19 is removably mounted on the upper end of the cylindrical wall 13, and is provided with a frusto-conical dome member 20 having a perforated plate or screen 21 at its upper end overlying the upper end of the vent tube 17. As shown in FIGS. 1 and 3, the lid 19 cooperates with the upper end portion of the vent tube 17 to provide a plurality of circumferentially spaced openings 22 that establish communication between the interior of the dome member 20 and the reservoir 1. The lower end of the vent tube 17 and tubular bearing 16 are in register with the radially inner end portion of the passage 10. A conventional germicidal lamp 23 is suitably mounted in the base section 3 and is disposed in the passage 10.

Means for dispensing dry granular food from the reservoir 1 to the mixing chamber 8 comprises an annular transfer device 24 that is disposed between the bottom wall 14 and partition 15 and rigidly secured to the lower end portion of the vent tube 17. The transfer device is formed to provide a plurality of circumferentially spaced segmental notches 25 that are adapted to move alternately into registration with circumferentially spaced openings 26 and 27 in the bottom wall 14 and partition 15 respectively, whereby to receive dry food from the reservoir 1 through the opening 27 and to drop measured quantities of the dry food into the mixing chamber 8 through the opening 26 in the bottom wall 14, responsive to rotation of the vent tube 17 and transfer device 23.

A drive motor, not shown, for the vent tube 17 and transfer device 24 is disposed within the motor chamber 6 and drives a gear 28 mounted on shaft means 29 suitably journaled in the base 2. A sleeve 30 is mounted on the upper end of the shaft means 29, and carries a plurality of drive and agitator rods 31 extend diametrically through the vent tube 17 and radially within the reservoir 1.

Liquid, such as water, is supplied to the bowl 7 by conventional means, not shown, the level of liquid in the bowl 7 being controlled by means including a sensing device 32. Dry granular food, dispensed from the reservoir 1 by the transfer device 24, drops into the liquid in the bowl 7 and is thoroughly mixed with the liquid. A flexible resilient suckling nipple 33 is connected to an outlet portion 34 of the bowl 7 adjacent the bottom thereof. The feeder is mounted in position for feeding a suckling animal by means including a support rod or tube 35 shown fragmentarily in FIG. 1 and which may be assumed to be connected to a suitable means of support.

The above-described liquid food mixer and animal feeder is fully disclosed in the above-mentioned U.S. Pat. No. 3,208,431. Hence, in the interest of brevity, further detailed showing and description thereof herein is omitted. It should suffice to state that preferably, the liquid in the bowl 7 is heated to a predetermined temperature suitable for young suckling animals, such as calves. In the feeder thus far described, vapor from the liquid in the bowl 7 rises upwardly through the passage 10 and vent tube 17, normally creating a slight draft upwardly therethrough. This upward draft causes outside air to be drawn inwardly through the openings 12 into the chamber 8. However, some of the vapor enters the dry food dispensing means including the transfer device 24 through the opening 26 in the bottom wall 14, the moisture condensing on the metal surfaces where it is absorbed by the dry granular food, causing the food to adhere to and build up on the surfaces of the wall 14, partition 15 and transfer device 24, and interfering with proper and uniform feeding of the granular food to the mixing chamber 8. Further, in cold weather, moisture rising through the vent tube 17 condenses on the inner wall surface thereof and to the inner surface of the dome member 20. Such condensation on the inner surface of the dome member 20 often results in moisture escaping downwardly into the interior of the reservoir 1 through the openings 22 in the lid 19 causing caking of the dry food in the reservoir 1.

The ventilating system of this invention includes a blower indicated generally at 36, the blower comprising a generally cylindrical housing 37 having an upper end wall 38 that is perforated to provide inlet apertures 39, and an open lower end defined by a frusto-conical flange 40 that is adapted to rest on the upper end portion of the dome member 20. A drive motor 41 is disposed axially within the housing 37, and is provided with legs or the like 42 that are bolted or otherwise rigidly secured to the screen 21. A pair of brackets 43 are rigidly secured to the lower end of the motor 41, the housing 37 being secured to the brackets 43 by screws or other suitable fastening means, indicated at 44. The motor 41 is provided with a drive shaft 45 on which is mounted a generally cylindrical fan 46 having a plurality of circumferentially spaced fan blades 47 secured at their opposite ends to end plates 48 and 49 the former of which defines an air inlet opening 50. With reference to FIG. 2, it will be seen that the brackets 43 are diametrically opposed, and that the motor 41 is provided with a pair of diametrically opposed bosses or spacer elements 51 that project radially outwardly from the motor 41 in directions normal to the anchoring screws 44. The bosses or spacer elements 51 engage the inner surface of the housing 37 to aid in holding the motor 41 and fan 46 against lateral movement in the housing 37.

The housing 37 and motor 41 cooperate to define an annular air passage 52 through which air flows responsive to rotation of the fan 46, the fan drawing air inwardly from the exterior of the housing 37 through the inlet openings 39 therein and the inlet opening 50 of the fan 46. The stream of air flows downwardly through the screen 21 into the dome element 20, a greater part of the air flowing downwardly through the vent tube 17, passage 10 and across the chamber 8 above the normal fluid level therein, and outwardly through the openings 12 to the exterior of the feeder. The flow of air moving across the mixing chamber 8 carries with it any vapors which arise from the liquid in the bowl 7. As the motor 41 operates, it warms up to its normal operating temperature, causing the air flowing thereby to be heated. The heated air passing across the mixing chamber 8 absorbs a substantial amount of the vapors rising from the liquid and the bowl 7. A conventional heating element 53, preferably of the electrical resistance type is shown in FIG. 1 as being disposed in the housing 37 for further heating the air as it passes downwardly through the annular passage 52 particularly during cold or damp weather. A portion of the air stream flows downwardly through the circumferentially spaced openings 22 in the lid 19 into the reservoir 1 and, when the reservoir is empty, downwardly through the opening 27, around the transfer device 24 and to the mixing chamber 8 through the opening 26. Thus, the granular food in the reservoir 1 and dispensing means or transfer device 24 is maintained in a dry, free-flowing condition until the same is dispensed to the liquid in the bowl 7; and when the reservoir is empty, condensation in the walls thereof is effectively prevented.

The modified blower arrangement shown in FIG. 4 is adapted to be used with the mixer and feeder of FIG. 1. In FIG. 4, a dry food reservoir is indicated generally at 1', the vent tube being indicated at 17'. A flat lid 54 is mounted on the open upper end of the reservoir 1' and has a central opening 55 through which the upper end portion of the vent tube 17' projects, the opening 55 being substantially covered by an annular screen 56. The open upper end of the vent tube 17' is also preferably covered by a screen 57. The blower of FIG. 4 includes a housing 58 having a bracket portion 59 that is pivotally secured to a hinge member 60 welded or otherwise rigidly secured to the upper end portion of the reservoir 1'. Further, the housing includes an internal bracket 61 on which is mounted a drive motor 62, to the drive shaft 63 on which is mounted a blower fan identical to the fan 46 and indicated by the reference numeral 46'. The fan 46' underlies an opening in the top wall 64 of the housing 58, said opening being covered by a screen 65. Normally, the housing is releasably locked against the lid 54 by a nut-equipped locking screw 66 extending through a flange 67 of the housing 58 and a suitable opening in the lid 54. As shown by arrows in FIG. 4, air is drawn into the housing 58 by the fan 46' and forced downwardly through the vent tube 17' and through the screened opening 55'. An arcuate baffle 64a cooperates with a portion of the housing 58 and the motor 62 to define an annular air passage 62a.

In the modified arrangement illustrated in FIG. 5, the blower of this invention is shown as being mounted on an automatic milk food mixer and suckling animal feeder of the type shown in the above-mentioned U.S. Pat. No. 3,037,481. The feeder illustrated in FIGS. 5 and 6 differs from that of U.S. Pat. No. 3,037,481 only in the construction of the dry food reservoir and cover therefor. As shown in FIG. 5, a dry food reservoir 67 has an inlet opening 68 that communicates with an enlarged supply hopper 69 bolted or otherwise rigidly secured to the reservoir 67. The reservoir 67 has a cover or lid 70 on which is mounted a blower 71 substantially identical to the blower 36, the only difference involving a flat bottom flange 72 at the lower outlet end of a housing 37', the flange 72 resetting upon the lid 70. A drive motor 41' drives a fan 46' to generate a flow of air downwardly through a perforated or screen inlet opening 39' in the top wall 38' of the housing 37'. The flow of air is directed to the interior of the reservoir 67 through openings 73 in the lid 70.

Although not shown, the arrangements of FIGS. 4 and 5 may be provided with heating elements, such as the heating element 53 for warming the air as it flows downwardly through the various parts of the feeders.

As disclosed in U.S. Pat. No. 3,037,481, a vertically disposed shaft 74 is journaled in the bottom wall 75 of the reservoir 67 and is driven by a motor 76 to impart rotation to a dry food dispenser rotor 77 mounted on the shaft 74. The rotor 77 is formed to provide a plurality of notches 78, one of which is shown, that move into registration with a delivery passage 79 overlying one side of a mixing chamber 80, defined by a bowl 81 having an outlet fitting 82 to which is secured a suckling nipple 83. Liquid, such as water is dispensed to the bowl 81 by suitable means including a valve 84, and the water is mixed with dry food by means of a rotary agitator or mixer 85. The bowl 81 is provided with a plurality of ventilator openings 86 above the normal liquid level of the mixing chamber 80. A generally cylindrical baffle provides a vent tube 87 and is disposed in the dry food reservoir 67 in overlying relationship to the delivery passage 79 and dispensing rotor 77, and terminates at its upper end in downwardly spaced relationship to the lid 70, the upper end of the vent tube 87 being covered by a screen 88. Inasmuch as the animal feeder of FIG. 5 is fully disclosed in the above-mentioned U.S. Pat. No. 3,037,481, further detailed showing and description thereof is omitted.

In the arrangement illustrated in FIG. 5, the blower 71 introduces air under pressure to the interior of the dry food reservoir 67 from whence it flows downwardly through the vent tube 87, and underlying notch 78 in the dispensing rotor 77, passage 79 into the mixing chamber 80, across the upper portion of the mixing chamber 80 and outwardly through the openings 86 in the bowl 81.

The modified arrangement illustrated in FIGS. 7-9 is adapted to be mounted on the upper end of the liquid food mixer and animal feeder of FIG. 1, those portions of the feeder of FIG. 1 shown in FIGS. 7-9 being identified by corresponding reference numerals. Thus, the cylindrical reservoir in FIGS. 7-9 is indicated at 13, and the vent tube is indicated at 17. The ventilating system of FIGS. 7-8 comprises cover means indicated generally at 90 and including a mounting plate 91 having a depending annular flange 92 and a central opening 93 having a bearing ring 94 mounted therein and adapted to encompass the upper end portion of the vent tube 17. The cover means 90 further includes wall structure which forms a horizontally disposed bottom plate or wall 95, a relatively low front wall 96, opposed side walls 97, an angular rear wall 98, a top wall 99 and a transverse vertical partition 100 disposed in closely rearwardly spaced relation to the upper end portion of the vent tube 17. The bottom plate or wall 95 is spot welded or otherwise rigidly secured to the mounting plate 91, the bottom wall 95 and mounting plate 91 having aligned generally segmental or arcuate openings 101 therethrough forwardly of the partition 100 and through which dry, granular food may be delivered to the interior of the reservoir 1. The cover means defines a filler opening above the openings 101 forwardly of the partition 100, that is normally closed by a closure member in the nature of a lid 102 hinged to the front edge of the top wall 99 adjacent the upper edge of the top wall 99 adjacent the upper edge of the partition 100, as indicated at 103. The top wall 99, partition 100, bottom wall 95 and angular rear wall 98 cooperate to define a chamber 104 which communicates with the interior of the reservoir 1 through aligned openings 105 in the bottom wall 95 and mounting plate 91 remote from the openings 101 and rearwardly of the partition 100. A cap 106 provided with a depending marginal flange 107 is secured to the partition 100 in overlying spaced relation to the upper end of the vent tube 17, to permit free passage of air into the vent tube 17, but to prevent granular food from entering the vent tube 17 when the reservoir 1 is being filled with granular food.

The cover means 90 includes a tubular member 108 having an outer end portion 109 that projects axially outwardly through a grommet 110 mounted in an opening 111 in the rear wall 98. The outer end portion 109 of the tubular member 108 defines an air inlet opening 112 that is covered by a perforate cap 113 which permits free passage of air inwardly to the tubular member 108, but which prevents particles of foreign matter from entering the same. The drive motor 114 is mounted in the chamber 104 coaxially within the tubular member 108 and is secured to the partition 100 by nut-equipped screws or studs 115, the motor 114 cooperating with the tubular member 108 to define an annular passage 116. The motor 114 has an axially projecting drive shaft 117 on which is mounted a fan 118 that is adapted to pull air inwardly through the perforate cap 113 and force air forwardly through the annular passage 116 through the rear outlet end 119 of the tubular member 108. From thence, the air flows downwardly through the aligned outlet openings 105 of the chamber 104 to the reservoir 1, upwardly through the arcuate openings 101 and into and downwardly through the vent tube 17 to the mixing chamber of the feeder.

The modified form of ventilating system illustrated in FIG. 10 is adapted to be used with the form of animal feeder illustrated in FIG. 1 with the lid 19 and parts mounted thereon removed. Those portions of the feeder illustrated in FIG. 10, that are identical with corresponding portions of the feeder of FIG. 1 are indicated by corresponding reference characters. In FIG. 10, the open top of the reservoir 1 is substantially closed by a flanged lid or cover 120 having a central opening 121 therethrough for the upper end portion of the vent tube 17. The lid 120 is provided with a dome member 122 having a tubular fitting 123 mounted therein. The base section 5 is formed to provide a notch or similar opening 124 for reception of a second tubular fitting 125 that is connected to the fitting 123 by a tubular conduit 126 that extends longitudinally of the exterior of the feeder. A blower, indicated generally at 127 includes a tubular housing 128 having an inlet opening 129 at one end that is covered by a screen or the like 130, and an air outlet 131 adjacent its opposite end connected to the fitting 125. A motor 132 is mounted coaxially within the tubular housing 128 and cooperates therewith to define an annular passage 133. The motor 132 has an axial drive shaft 134 on which is mounted a rotary fan 135.

Although not shown, the arrangements of FIGS. 4-10 may be provided with heating elements, such as the heating element 53 for further warming the air propelled through the various heaters thereof. Further, it will be appreciated that the feeder may be effectively ventilated in the manner set forth by a blower remote from the upper end of the reservoir, as indicated by the arrangement illustrated in FIG. 10. Still further, while squirrel cage-type fans are shown in the several forms of the invention, other types of fans, such as the propeller blade type may be effectively used.

What is claimed is:

1. A ventilating system for a liquid food mixer and animal feeder, said mixer and feeder including structure defining, a reservoir for dry granular food and having a cover element, a mixing chamber having an outlet in its bottom portion, a feeding nipple secured to said outlet, mechanism for dispensing dry food from said reservoir to the mixing chamber, means for delivering liquid to the mixing chamber, a vent passage extending generally upwardly from the mixing chamber adjacent one side of the mixing chamber toward said cover element, and air passage means extending from the exterior of said feeder to said mixing chamber adjacent an opposite side of the mixing chamber and above the normal level of liquid in said mixing chamber; said system including, said vent passage, air passage means, and a blower comprising a housing having an inlet communicating with atmosphere exterior of said feeder and an outlet communicating with the upper end of said vent passage and said reservoir, a motor in said housing having a drive shaft, and a rotary fan mounted on said shaft, said blower being disposed and arranged to deliver a flow of air under pressure from the exterior of said feeder downwardly through said vent passage, reservoir and dry food dispensing mechanism and across said mixing chamber and outwardly therefrom through said air passage means, said flow of air carrying moisture outwardly from the mixing chamber through said passage means and providing a barrier against movement of moisture from said mixing chamber to said vent, dispensing mechanism and reservoir.

2. The ventilating system defined in claim 1, characterized by mounting means for mounting said housing on said cover element above the upper end of said vent tube.

3. The ventilating system defined in claim 2 in which said motor is mounted on said cover element, said mounting means including a pair of brackets on said motor, said housing being anchored to said brackets.

4. The ventilating system defined in claim 1 characterized by hinge means pivotally mounting said housing on said structure for movements toward and away from overlying engagement with said cover element, said hinge means including a bracket portion for supporting said motor and fan within said housing.

5. The ventilating system defined in claim 1, characterized by a heating element in said housing in the path of said flow of air.

6. The ventilating system defined in claim 1 in which said blower comprises a generally cylindrical housing having an inlet and an outlet, a motor extending generally axially of said housing and cooperating therewith to define a generally annular passage, said motor having a drive shaft, and a rotary fan mounted on said drive shaft and operative to propel air from said inlet axially through said generally annular passage to said outlet, said motor radiating heat to air moving through said passage.

7. The ventilating system defined in claim 6 in which said blower is disposed remote from said reservoir, characterized by an elongated tubular conductor extending from said blower outlet to said cover element, said blower outlet communicating with said vent passage through said tubular conductor.

8. The ventilating system defined in claim 7 in which said blower is disposed adjacent said mixing chamber at the bottom portion of said feeder.

9. A ventilating system for a liquid food mixer and feeder, said mixer and feeder including structure defining a reservoir for dry, granular food, a mixing chamber having an outlet in its bottom portion, a feeding nipple secured to said outlet, mechanism for dispensing dry food from said reservoir to the mixing chamber, means for delivering liquid to the mixing chamber, a vent passage extending generally upwardly from the mixing chamber toward the upper end of said reservoir, and air passage means extending from the exterior of said feeder to the mixing chamber in spaced relation to said vent passage and above the normal level of liquid in said mixing chambers; said ventilating system comprising, said vent passage and air passage means, cover means for said reservoir and defining a blower chamber having an air inlet to the exterior of the feeder and an air outlet to the interior of said reservoir, and a blower in said chamber arranged to draw air inwardly through said air inlet and deliver air through said outlet under pressure downwardly through said vent, reservoir and dry food dispensing mechanism, across said mixing chamber above the level of liquid therein and outwardly through said air passage means, said air under pressure providing a barrier against movement of moisture from said mixing chamber toward said dispensing mechanism, reservoir and vent passage.

10. The ventilating system defined in claim 9 in which said blower includes a motor having a rotary drive shaft and a fan mounted on said drive shaft, said cover means having a portion cooperating with said blower to define an annular passage between said air inlet and outlet, whereby air moving through said annular passage is exposed to heat generated by said motor.

11. The ventilating system defined in claim 9 in which said cover means defines a filler opening for reception of granular food to said reservoir remote from said blower chamber, and includes a closure member for said opening, characterized by a cap element mounted in overlying spaced relation to said vent passage for shielding said vent passage against admission of granular food thereinto but permitting free flow of air into said vent passage from said blower.

12. The ventilating system defined in claim 11 in which said cover means includes inner wall structure separating said blower chamber from said filler opening, said inner wall structure defining said air outlet.

* * * * *